United States Patent [19]
Hurtig et al.

[11] 3,836,091
[45] Sept. 17, 1974

[54] FILM CASSETTE

[75] Inventors: Roy E. Hurtig, Monte Sereno; Don W. Geri, Los Gatos, both of Calif.

[73] Assignee: Memorex Corporation, Santa Clara, Calif.

[22] Filed: Apr. 15, 1971

[21] Appl. No.: 134,236

[52] U.S. Cl. ................. 242/71.2, 242/68.5, 242/74
[51] Int. Cl. .......................... G03b 1/04, B65h 75/02
[58] Field of Search ......... 242/71.2, 71.1, 197, 198, 242/199, 200, 68.5, 74; 40/86 A, 86 R; 352/72, 78

[56]  References Cited
UNITED STATES PATENTS

| | | | |
|---|---|---|---|
| 1,964,879 | 7/1934 | Jelinek | 352/78 R |
| 2,161,341 | 6/1939 | Fairbanks | 242/71.2 |
| 2,391,497 | 12/1945 | Wilson | 242/71.2 |
| 3,246,729 | 4/1966 | Bishop | 242/74 X |
| 3,258,215 | 6/1966 | Ono | 242/197 X |
| 3,378,212 | 4/1968 | Johnson | 242/210 |
| 3,523,657 | 8/1970 | Hearon | 242/200 |
| 3,614,012 | 10/1971 | Edelman | 242/71.2 |
| 3,640,483 | 2/1972 | Beck | 242/195 |
| 3,680,812 | 8/1972 | Rayner | 242/199 |

FOREIGN PATENTS OR APPLICATIONS

| | | | |
|---|---|---|---|
| 866,403 | 4/1961 | Great Britain | 242/74 |

*Primary Examiner*—John W. Huckert
*Assistant Examiner*—Edward J. McCarthy
*Attorney, Agent, or Firm*—Limbach, Limbach & Sutton

[57] ABSTRACT

A cassette for handling films, microfilm and the like for use with a display or reading device. A pair of film chambers are provided having rotatable cores for handling the film. A film guide path extending between the chambers has a "floating" film gate disposed over an aperture in the cassette for acceptance of a light source. The floating film gate contacts the film reader to assure exact film to optics spacing. The rotatable film cores include a unique three-slot construction to provide secure holding of film ends without resort to glue, pins or other means of attachment.

22 Claims, 12 Drawing Figures

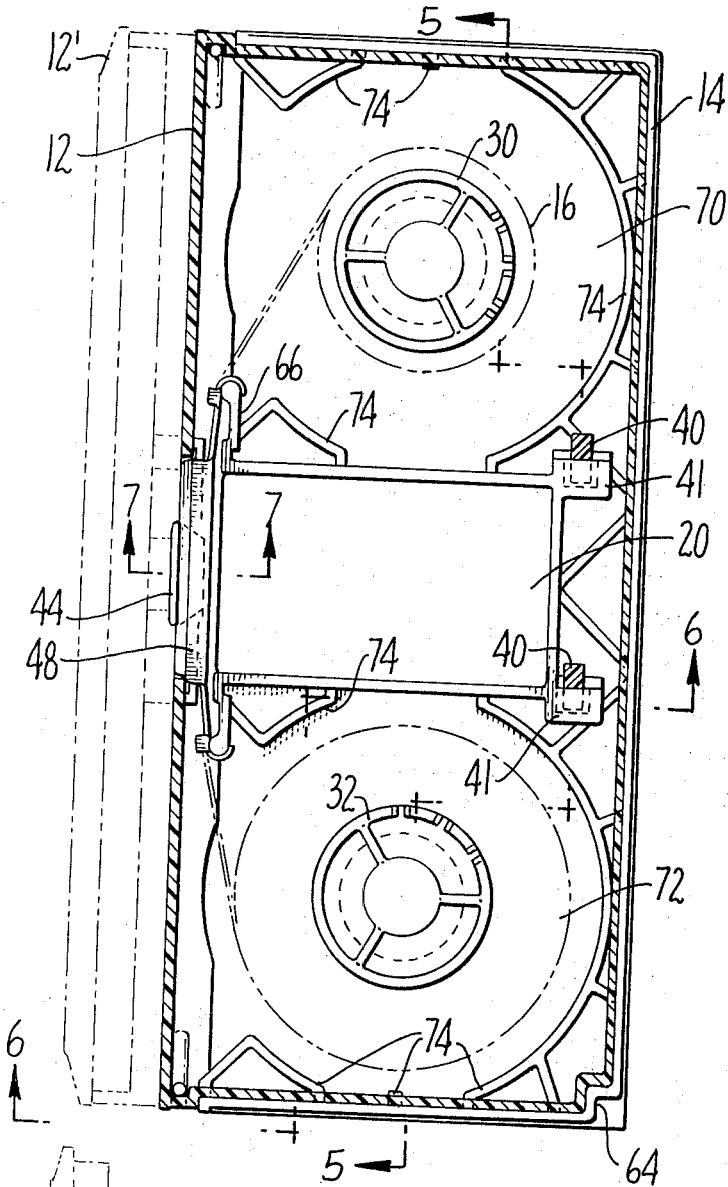
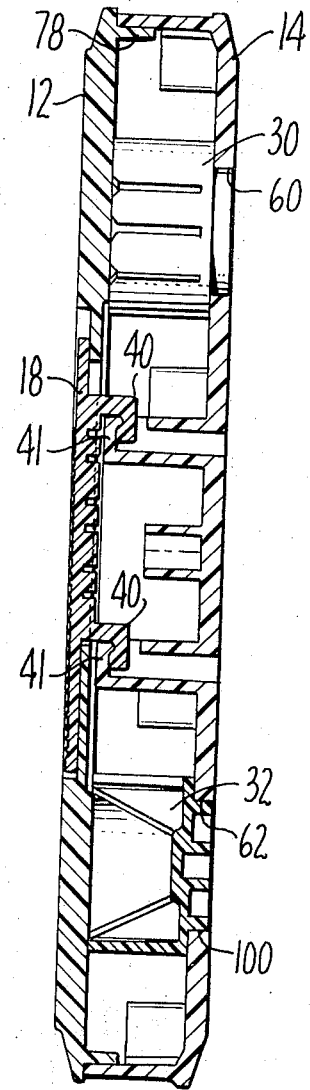
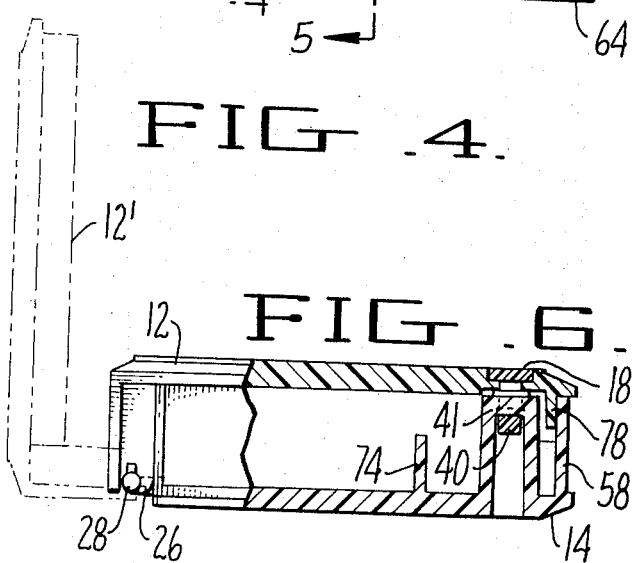
FIG. 4.   FIG. 5.
FIG. 6.

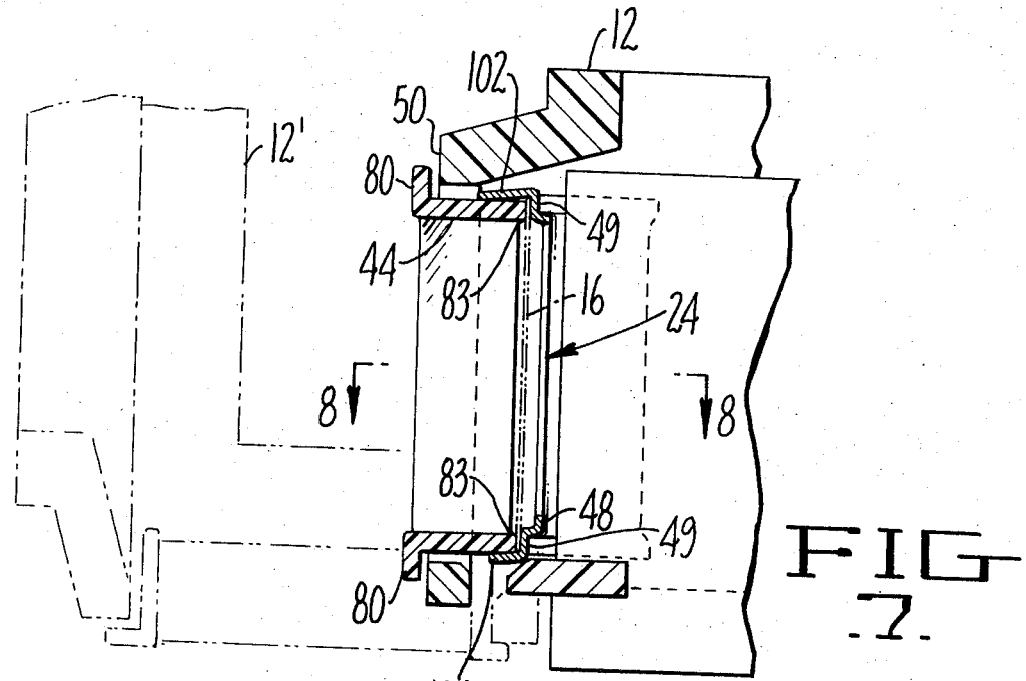
FIG. 7.
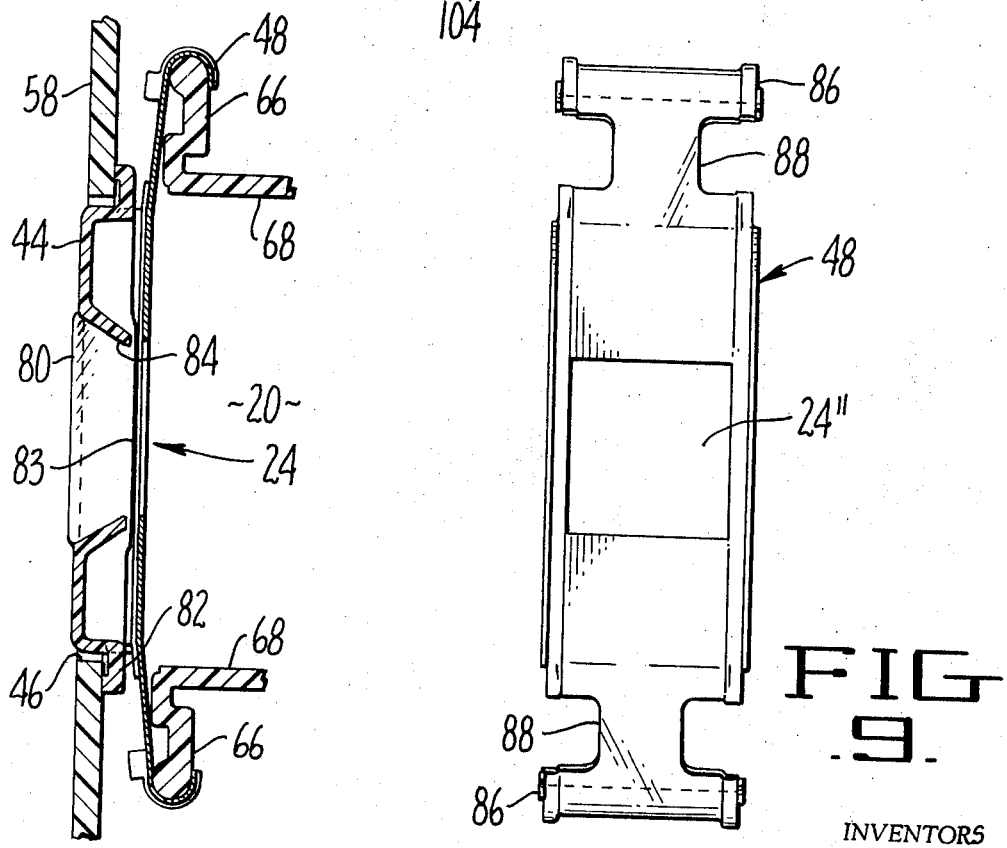
FIG. 8.
FIG. 9.
INVENTORS
ROY E. HURTIG
DON W. GERL
GARY E. HART
BY Limbach, Limbach & Sutton
ATTORNEYS

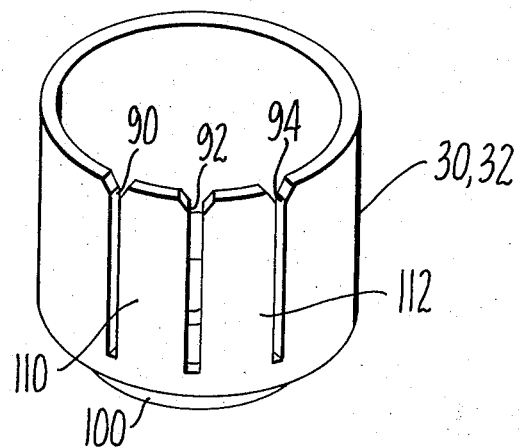
FIG_10.
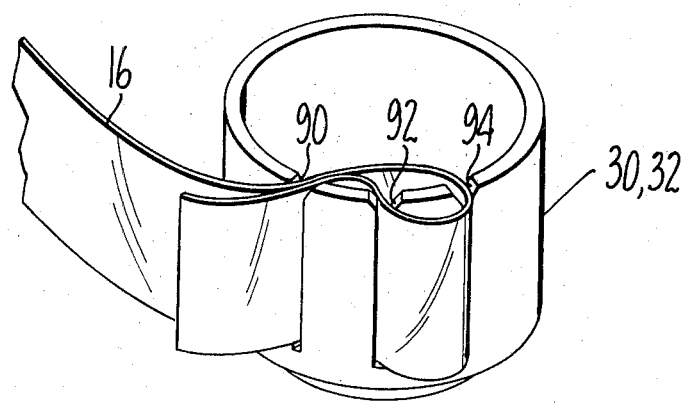
FIG_11.
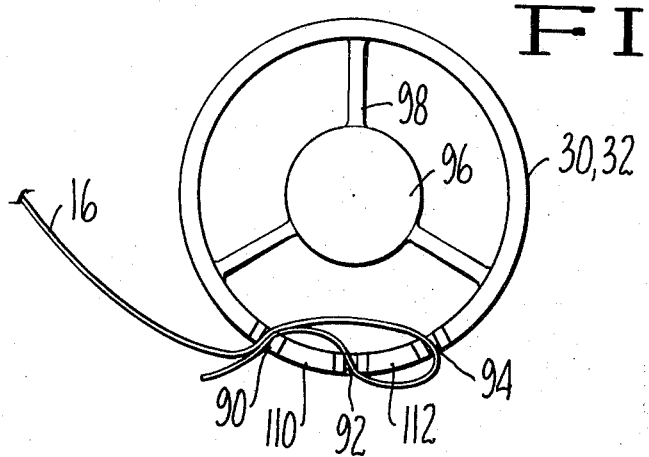
FIG_12.
INVENTORS
ROY E. HURTIG
BY DON W. GERI
GARY E. HART
Limbach, Limbach & Sutton
ATTORNEYS

FILM CASSETTE

BACKGROUND OF THE INVENTION

This invention relates to information display apparatus and more particularly to a cassette adapted to handle film, microfilm or other flexible storage media for use with a readout or display device.

Cassettes and cartridges have become widely used with magnetic recording tape due to their convenience and ease of use, obviating the need for direct handling of tape by the user as required in reel-to-reel type tape handling devices. The requirement for a convenient means to handle film and microfilm is also apparent. However, additional problems are encountered when the storage media is other than magnetic tape. For example, magnetic tape is placed in direct contact with playback or record heads, whereas film or microfilm must be spaced in relation to an optical lens system. Prior art film cartridges, for example, have sidestepped this problem by bringing the film out of the cartridge enclosure so as to handle the film in the same manner as reel-to-reel film.

It is, however, desirable to provide a unitary cassette in which the film, microfilm, etc. is retained within the cassette enclosure. Problems in film damage, threading, etc. are thus eliminated. Yet, the necessity to provide the proper relationship between the film and lens system must be met.

In addition, it is desirable to provide a film cassette that provides accessibility to the film so that splices may be expedited or the film may be replaced with other film if desired. One problem in film replacement is to provide a means to attach the film securely, yet removably from the film support. Heretofore, means of attachment have included use of adhesive tape, pins, glue, etc. Also, slots and posts in the hubs or cores have been used, but such means have generally not provided secure holding particularly when the end of the film is reached when the cassette or cartridge is in a fast wind mode.

SUMMARY OF THE INVENTION

In order to overcome many of the aforementioned problems, a cassette is provided for use with film, microfilm or other flexible media, comprising an openable enclosure. A central aperture is provided for insertion of a light source from an external reading or display device. The film path is disposed over the light source aperture and includes a "floating" or movable film gate. The gate provides a fixed spacing between the film path and the outer portion of the film gate, so that the film gate can abut the external optical system to assure the proper film to optics spacing. A pair of film chambers are disposed on either side of the light source aperture for containment of the film support hubs or cores. The cassette has a hinged cover member that includes a portion of the film gate so that when the cassette is open access is provided to the film chambers and the film channel. The film support cores include a side wall with three open-ended slots for holding the film ends securely. Means are provided in the cassette exterior to assure proper insertion of the cassette into an external display or reading device.

BRIEF DESCRIPTION OF THE DRAWINGS

FIG. 4 is a sectional plan view of the film cassette.

FIG. 5 is a sectional elevational view through section lines 5—5 of FIG. 4.

FIG. 6 is a sectional side view through section lines 6—6 of FIG. 4.

FIG. 7 is a partial sectional view through section lines 7—7 of FIG. 4.

FIG. 8 is a partial section view through section lines 8—8 of FIG. 7.

FIG. 9 is a plan view of the inner gate member.

FIG. 10 is a perspective view of the film core.

FIG. 11 is a perspective view of the film core showing the preferred method of attaching film.

FIG. 12 is a plan view of the film core showing the preferred method of attaching film.

DESCRIPTION OF THE PREFERRED EMBODIMENTS

Figure 1:
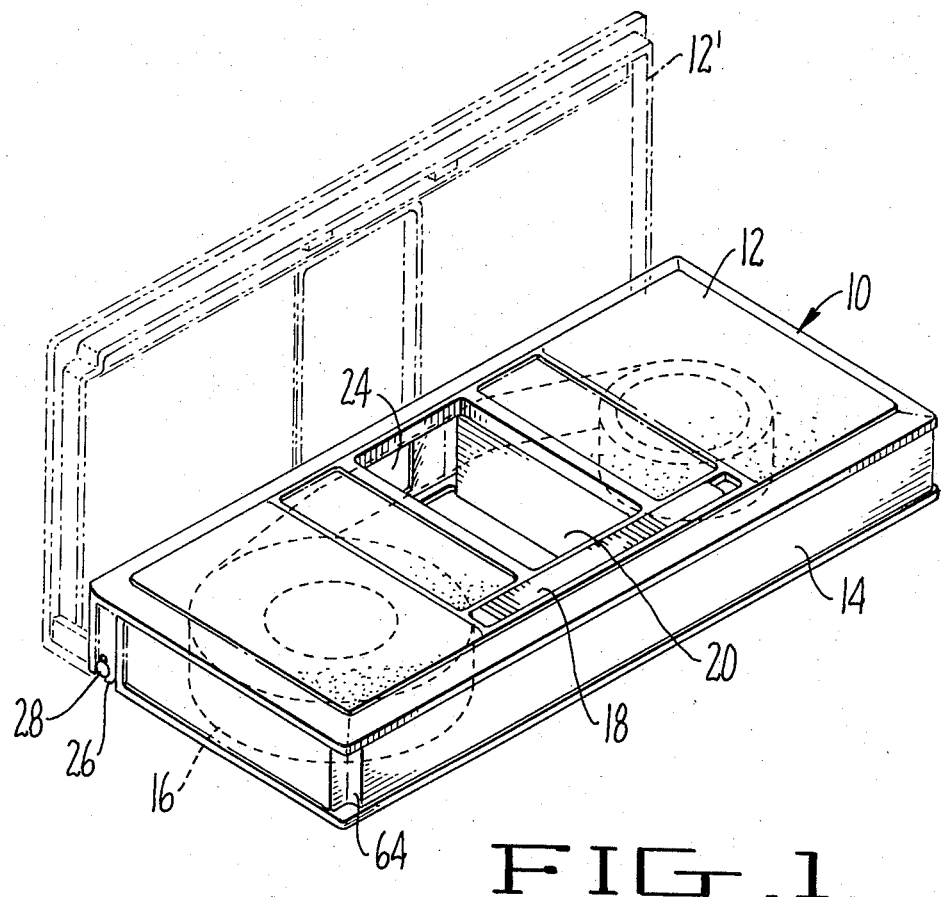
FIG. 1 is an isometric perspective view of one side of the film cassette according to an embodiment of the present invention.
Figure 2:
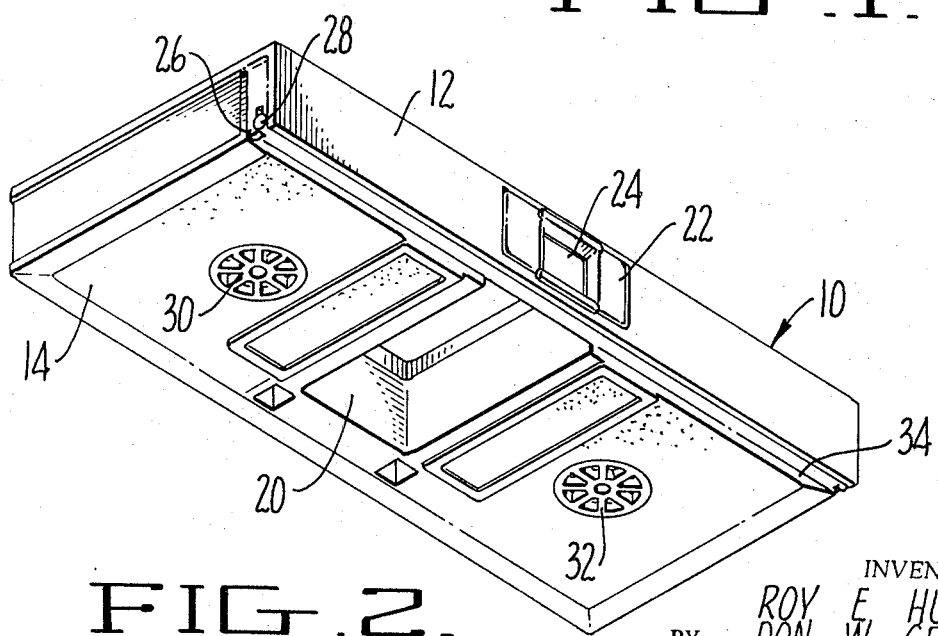
FIG. 2 is a view similar to FIG. 1 showing the reverse side of the film cassette.

Referring now to FIGS. 1 and 2 wherein perspective views of the film cassette according to one embodiment of the present invention are shown. The cassette 10 comprises a cover member 12 and a base member 14; the cover member 12 hinges at the sides of the cassette on hinge pins 28; in its open position shown at 12' the cover member is out of the way to provide access to an internally contained film or microfilm 16. As explained in greater detail hereinafter, the cover member 12 is removable from the base member and is held in engagement with hinge pins 28 by snaps 26. A sliding latch 18 permits the cover member to be locked in a closed position with base members 14. A rectangular central aperture 20 is centrally located in the cassette 10 for acceptance of a light source (not shown) when the cassette is used with a film reader (not shown). The film 16 is wound on a pair of rotatable cores 30 and 32 and passes through a film gate 22 located adjacent the central aperture 20. A film aperture 24, the size of a frame in said film, is provided in the film gate for making the film content available to the external film reader. A shoulder 34 along one edge of the cassette and a notch 64 in one edge of the cassette provide a non-ambiguous sexual mating of the cassette with the external film reader unit (not shown) to ensure that the cassette can be inserted in only one manner.

Figure 3:
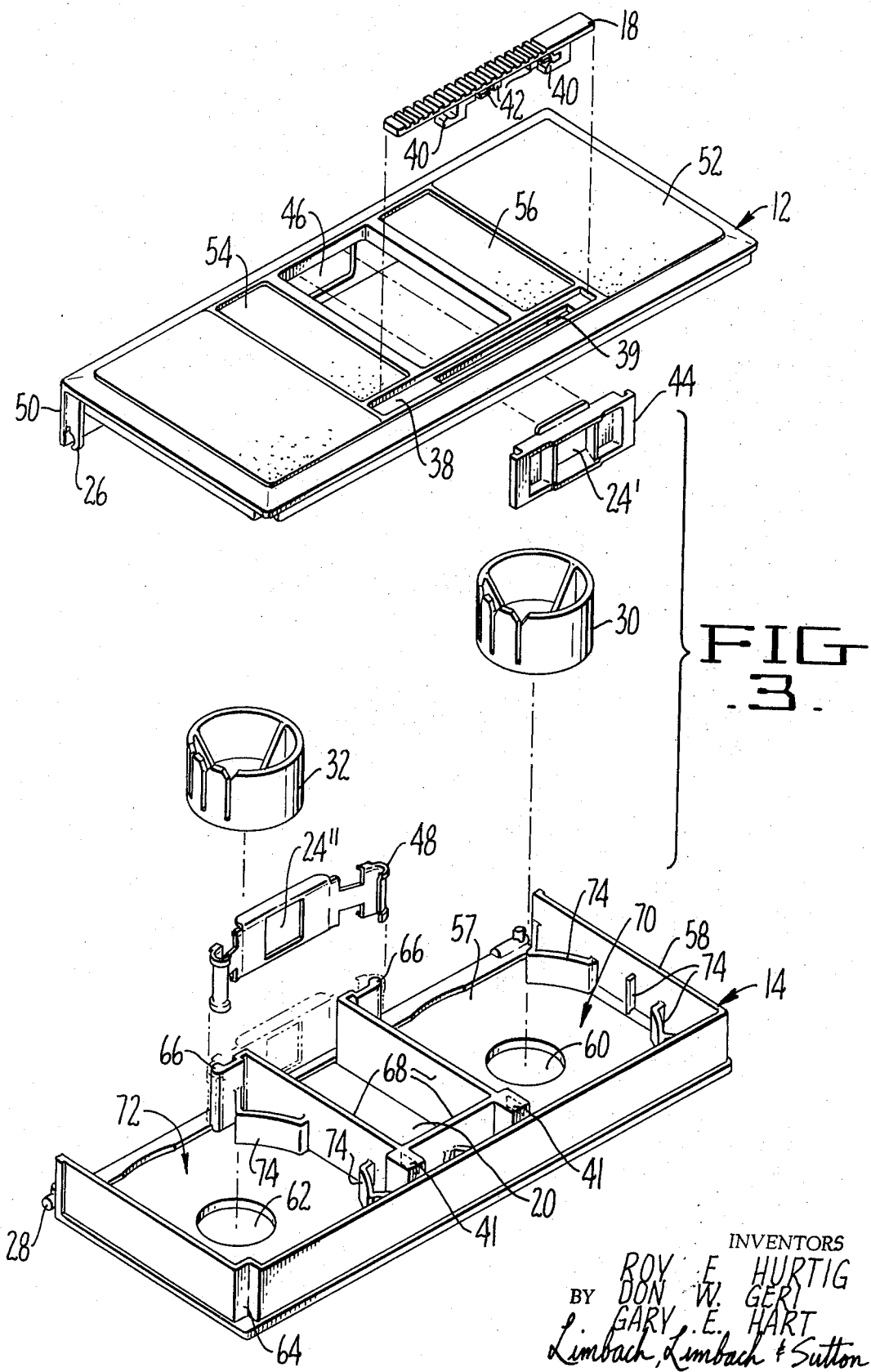
FIG. 3 is an exploded isometric view of the film cassette similar to FIG. 1.

Referring now to FIG. 3 wherein an exploded perspective view of the cassette 10 is shown. Cover member 12 has a top portion 52 and a side wall portion 50 along one edge of the top portion. A latch guide channel 38 is provided for the latch 18 including a slot 39 in the channel for insertion of the latch catches 40 and the latch flanges 42. The flanges 42 engage the bottom side of the slot 39 in order to hold the latch 18 in the guide channel 38. When the latch is slid to its right-hand position, catches 40 are free of the latch-engaging slots 41 in the base member 14; when the latch is slid to the left the catches 40 enter into the engaging slots 41 and hold the two members closely together. An outer gate member 44, forming a portion of the film gate 22, has a film aperture 24' and fits within aperture 46 located in the cover member side wall 50. A pair of rectangular depressed areas 54 and 56 in the top surface of the cover member 12 may be opaque or alternately may be clear so as to permit visual inspection of the quantity of film wound on each core 32 and 30.

The base member 14 has a bottom portion 57 having a side wall 58 along three sides thereof. One edge of side wall 58 forms the notch 64 previously mentioned. An inner wall 68 defines the aperture 20 in the base member. The area to the right of inner wall 68 defines a film chamber 70 in which an aperture 60 is provided for the base of core 30 to fit in. The portion of the base member to the left of inner wall 68 defines a further film chamber 72 in which an aperture 62 is provided for the core 32 to fit in. A plurality of film guide wall sections are disposed along portions of a circle centered on apertures 60 and 62 in order to space film in chambers 70 and 72 away from the side walls so that the film is not damaged by the lips of the cover member when closed. A continuous curve could be used instead of sections if the technique for forming the cassette permits. If molding is used to form the cassette the requirement for narrow cross sections may necessitate the wall sections as shown herein.

A pair of ears 66 extend outwardly from the end of inner wall 68 for supporting an inner gate member 48 which has a film aperture 24″ located therein. Inner gate member 48 may be heat staked to the ears 66 to prevent vertical movement thereof and to restrict its horizontal movement. As will be explained in greater detail hereinafter the inner and outer gate members 48 and 44 define a film path between the film chambers 70 and 72 which is movable or "floating" relative to the cassette body but which engages the external film reader and maintains a fixed distance between the reader's optics and the film passing through the film gate.

The cover member 12 hinged at 26 is designed to provide a camming action when the cover member is rotated greater than 90° with respect to the base member. Upon rotation beyond that point, the bottom edge of side wall 50 engages the bottom portion 57 of the base member and causes the snap 22 to flex slightly thereby releasing the cover member from the base member.

Referring now to FIGS. 4, 5 and 6, wherein FIG. 4 shows a cross sectional plan view through a closed cassette, FIG. 5 shows a cross sectional elevation view through section lines 5—5 of FIG. 4 and FIG. 6 shows a cross sectional side elevation view through section line 6—6 of FIG. 4. A quantity of film 16 is shown wound on core 32 in the film chamber 72, following the film guide path between the inner gate 48 and the outer gate 44, and reaching the core 30 in film chamber 70. Details of the film gate 24 are shown in FIGS. 7, 8 and 9. It will be apparent from inspection of FIG. 4 that the film chambers 70 and 72 are generally circular as defined by the film guide wall section 74.

FIG. 5 shows particularly the manner in which latch 18 engages the retaining slots 41 in the base member 14. In addition, it will be seen that the rotatable cores 30 and 32 have a base portion 100 having a smaller diameter which fits into the apertures 60 and 62. When the cassette is closed the cores 30 and 32 are restrained from any substantial vertical movement, although sufficient spacing is provided so that the cores are free to turn. The bases 100 of cores 30 and 32 are available external to the cassette for engaging a drive mechanism in the external film reader (not shown).

FIG. 6 shows the manner in which the cover and base members are engaged, cover member 12 has a short lip 78 which fits inside the side wall 58 of the base member 14 to provide further structural stability to the cassette 10. The figure also shows latch catch 40 adjacent the latch-engaging slot 41.

In a practical model of the cassette 10 the cover and base members 12 and 14 are formed of injection molded plastic such as that marketed by General Electric under the trademark "NORYL." The cores 30 and 32 are injection molded from polypropylene. The inner gate member 48 is formed from a metal strip such as a copper-beryllium alloy strip of narrow gauge, for example 0.007″. The outer gate member 44 is injection molded from a plastic such as "Durez" made by Hooker Chemical Company.

Referring now to FIGS. 7, 8 and 9, the details of the film gate 22 are shown with the cover and base members closed. It will be apparent that the inner gate member 48, a part of the base member 14 and the outer gate member 44, a part of the cover member 12, are separated when the cassette is opened. As seen in FIGS. 7 and 8, outer gate member 44 has a pair of flanges 80 along a portion of its top and bottom outer edges. The flanges engage the outside of side wall 50 of cover member 12 when the gate is pushed inward; in the absence of an outside force, the spring action of the inner gate member maintains the flanges 80 spaced slightly from the sidewall. A further pair of flanges 82 are provided at the side edges of outer gate 44 for engaging the inner part of sidewall 58 as best seen in FIG. 8. Flanges 80 and 82 hold the outer gate member 44 within aperture 46, but are dimensioned so as to permit some movement of the gate with respect to the outer wall 58. The inner portion of outer gate member 44 has flared portions 83 adjacent the film aperture 24 for engaging the inner gate member 48. A film channel is provided for the film 16 between the inner and outer gate members; the film edges are held between the gate members along the flared portions 83 of the outer gate member and portions 49 of the inner gate member; however, the central area of the film carrying the image does not touch the film gate members since the central portions of the gate members are spaced away from the film. Flanged portions 102 and 104 of the inner gate 48 prevent vertical motion of the film 16. The spring action of the inner gate member pressing against the outer gate member tends to press the outer gate member outward so that a light pressure holds the film at its edges and so that flanges 82 are resting against the sidewall 58. The pressure on the edges of the film does not affect its ability to pass through the film gate. The inner and outer gate members along with the film channel defined between them can be moved inward slightly in response to an external force on flanges 58. Thus, when the cassette is used in association with an external film reader, flanges 80 can be used as a guide to assure exact spacing between the film channel and the external optics.

The inner gate member 48, heat staked to the ears 66, is shown in detail in FIG. 9 as a narrow metal strip having spring-like characteristics. A central aperture 24″ is provided for the film. The strips have narrow neck portions 88 in order to enhance the spring characteristics of the gate. The end portions 86 are curved in order to fit around the ears 66.

Referring now particularly to FIGS. 10, 11 and 12, details of the film cores 30 and 32 are shown. The cores are cup-like circular cylindrical open topped bodies having three vertical slots 90, 92 and 94 defining a pair of fingers 110 and 112 in the sidewalls thereof. A circular base 100 having a diameter smaller than the main cylindrical portion of the core is designed to ride in the apertures 60 and 62 in cassette 10. Base 100 is best seen in FIG. 5. A plurality of spokes are provided in the bottom of the base 100 for engaging an external drive mechanism. The spokes are best seen in FIG. 2. The inside bottom of the cores 30 and 32 have a short upright post 96 with three upward sloping struts 98. See also FIG. 3.

It has been found that the cores 30, 32 provide a very secure hold on the end of film 16 when it is threaded, as shown in FIGS. 11 and 12. The film 16 is looped back on itself away from the core, the loop is placed over finger 112 and the double thickness of film is brought out through slot 90, the remaining unused slot. It has been found that a strong pull either to the left, in the direction in which film 16 is shown in FIGS. 11 and 12, or a pull to the right, opposite the direction in which the film is shown, results in a firm holding of the film by the core. This particular method of attachment has been found to be essential to the secure holding of the film. For example, if the film is looped back on itself toward the core, thus placing the tail end adjacent the core, inside the longer length of film, the film easily pulls out of the slots. The necessity to tape, glue, pin or otherwise permanently fix film to the cores is therefore obviated, yet extreme strength of attachment between the film and core is achieved.

It will be appreciated that core 30, 32 and the method of attaching film thereto are equally applicable to typewriter ribbon, magnetic tape, camera film, paper tape, and other thin flexible materials.

Those of ordinary skill in the art will also recognize that the cassette disclosed herein is susceptible to uses other than with film or microfilm. For example, other types of storage media having similar display requirements may be used in the cassette. It is therefore to be understood that the recitation of "film" in the appended claims is intended to include any flexible information media capable of use in the claimed combination.

We claim:

1. In a film cassette for use with external display means, said cassette having a pair of film chambers, a rotatable film core supported within each of said chambers and a film guide path extending between said chambers, the improvement comprising
    film gate means movably secured along a
        side of said cassette and defining a portion of said film guide path for interfacing with an external display means to hold said film guide path in a predetermined relationship with respect to said external display means.

2. A film cassette according to claim 1 wherein said film gate comprises an outer gate member and an inner gate member, said film guide path extending between said gate members.

3. A film cassette according to claim 2 wherein said inner gate member comprises a spring strip having flanged portions along its length for defining the vertical boundaries of said film guide path, said strip secured to said cassette at the extremities of said strip, whereby said strip has spring movement perpendicular to the plane of the strip and film guide path.

4. A film cassette according to claim 3 wherein said outer gate member comprises a rigid member movably secured along said cassette side and adapted to mate with said inner gate member to define said film guide path therebetween, whereby said film guide path is fixed relative to said gate members and movable relative to said cassette.

5. A film cassette according to claim 4 wherein said inner and outer gate members have apertures therein, said apertures being in substantial registration when said gate members are mated, said apertures having dimensions selected to substantially match the frame dimensions of film used in said cassette.

6. A film cassette according to claim 5 wherein said cassette has a centrally located aperture between said film chambers and adjacent said gate means.

7. A film cassette according to claim 6 wherein said cassette comprises a base member and a cover member defining an enclosure, said inner gate member attached to one of said base and cover members and said outer gate member held in the other of said base and cover members.

8. A film cassette according to claim 7 wherein said base and cover members are hinged together whereby in an open position said gate members are separated to permit access to said film guide path and in a closed position said gate members are mated.

9. A film cassette according to claim 8 further comprising means in said cassette enclosure to provide a non-ambiguous sexual mating of said cassette with said external display means.

10. A film cassette according to claim 9 further comprising latch means for locking said cover and base members in a closed position.

11. A film cassette adapted to contain film for use with an external film display means having a light source comprising
    an enclosure having an aperture therein for acceptance of said light source, said aperture extending through a side of said enclosure and
    film gate means in the side of said enclosure over said light source aperture for guiding film past said light source aperture, said gate means having an aperture therein whereby said film is open to said light source aperture and the side of said cassette, said film gate means being movably secured in the side of said cassette and said film being held in a predetermined relationship with respect to said gate.

12. A film cassette according to claim 11 wherein said enclosure includes a pair of film chambers for holding a supply of film.

13. A film cassette according to claim 12 further comprising a rotatable film core in each of said film chambers.

14. A film cassette according to claim 13 further comprising a pair of windows in said enclosure adjacent each of said film chambers for viewing the contents of said chambers.

15. A film cassette according to claim 14 wherein said enclosure includes notch means for assuring non-ambiguous sexual mating of said cassette with an external display means.

16. A film cassette according to claim 15 further comprising a supply of film having the ends thereof attached to each of said film cores and extending through said film gate means.

17. A film cassette according to claim 16 wherein each of said film cores comprises a cup-shaped body having three openended slots defining a pair of fingers in the sidewall thereof for attaching said film.

18. A film cassette according to claim 17 wherein said film is attached to said core by forming a loop back upon itself away from said core, said loop passing over and around one of said fingers and the double thickness of film passing through the remaining slot.

19. A film cassette according to claim 18 wherein said enclosure has an aperture in each of said film chambers and said film cores have a base portion adapted to fit in said apertures for rotation therein.

20. Supply and take-up apparatus for a flexible medium comprising
    a cup-shaped body on which said medium is adapted to be wound and unwound,
    said body having a base portion and a sidewall having three open-ended slots therein defining a pair of fingers for securely holding the end of a supply of said medium,
    said base portion having a plurality of spokes adapted to engage an external drive mechanism, and
    a length of said flexible medium looped through the two end slots and thence around one of said fingers back upon itself through the middle slot and back through the initial end slot forming a double thickness of medium passing through said initial end slot.

21. The combination of claim 20 wherein said base portion and sidewall are cylindrical and said base portion has a diameter smaller than the diameter of said cylindrical sidewall.

22. The combination of claim 21 wherein said slots are substantially parallel to the main axis of said cylindrical sidewall.

* * * * *